US012689565B2

(12) United States Patent
Cyras et al.

(10) Patent No.: US 12,689,565 B2
(45) Date of Patent: Jul. 21, 2026

(54) METHODS FOR DETERMINING A TARGET NETWORK CONFIGURATION

(71) Applicant: Telefonaktiebolaget LM Ericsson (publ), Stockholm (SE)

(72) Inventors: Kristijonas Cyras, San Jose, CA (US); Marin Orlic, Bromma (SE); Aneta Vulgarakis Feljan, Stockholm (SE); Saurabh Singh, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 236 days.

(21) Appl. No.: 18/274,375

(22) PCT Filed: Feb. 9, 2021

(86) PCT No.: PCT/SE2021/050096
§ 371 (c)(1),
(2) Date: Jul. 26, 2023

(87) PCT Pub. No.: WO2022/173336
PCT Pub. Date: Aug. 18, 2022

(65) Prior Publication Data
US 2024/0089182 A1 Mar. 14, 2024

(51) Int. Cl.
H04L 41/5019 (2022.01)
H04L 41/0823 (2022.01)
(Continued)

(52) U.S. Cl.
CPC ...... H04L 41/5019 (2013.01); H04L 41/0823 (2013.01); H04L 41/16 (2013.01);
(Continued)

(58) Field of Classification Search
CPC ... H04L 41/0823; H04L 41/147; H04L 41/16; H04L 41/5006; H04L 41/5019; H04W 24/02
See application file for complete search history.

(56) References Cited

U.S. PATENT DOCUMENTS 6,421,719 B1 7/2002 Lewis et al.
10,355,922 B1 7/2019 Stienhans
(Continued)

FOREIGN PATENT DOCUMENTS

CN 103765818 A 4/2014
EP 3742669 A1 11/2020
(Continued)

OTHER PUBLICATIONS

International Search Report and Written Opinion of the International Searching Authority, PCT/SE2021/050096, mailed Sep. 16, 2021, 14 pages.
(Continued)

*Primary Examiner* — Angela Widhalm De Rodriguez
(74) *Attorney, Agent, or Firm* — Sage Patent Group

(57) ABSTRACT

A method performed by a node in a communications network for determining a target network configuration for use in providing services to a first operator on the communications network. The method includes obtaining characteristics of the first operator; obtaining, for a plurality of previous operators in the communications network, characteristics of the previous operators and corresponding target network configurations used for the respective previous operators; matching the first operator to a second operator selected from the previous operators based on similarity between the characteristics of the first operator and the characteristics of the previous operators; and determining the target network
(Continued)

300 configuration for the first operator, based on a target network configuration used for the second operator.

20 Claims, 4 Drawing Sheets

(51) Int. Cl.

| | |
|---|---|
| *H04L 41/16* | (2022.01) |
| *H04L 41/5006* | (2022.01) |
| *H04W 24/02* | (2009.01) |
| *H04L 41/147* | (2022.01) |

(52) U.S. Cl.
CPC ......... *H04L 41/5006* (2013.01); *H04W 24/02* (2013.01); *H04L 41/147* (2013.01)

(56) References Cited

U.S. PATENT DOCUMENTS

| | | | | |
|---|---|---|---|---|
| 11,212,710 | B1 * | 12/2021 | Mahimkar | H04W 48/12 |
| 2014/0280946 | A1 * | 9/2014 | Mukherjee | H04L 67/51 709/226 |
| 2014/0315560 | A1 | 10/2014 | Smith et al. | |
| 2016/0219107 | A1 * | 7/2016 | Jain | G06F 3/0619 |
| 2016/0286411 | A1 | 9/2016 | Tarraf et al. | |
| 2017/0005864 | A1 | 1/2017 | Liu et al. | |
| 2017/0083374 | A1 * | 3/2017 | Yin | H04L 47/82 |
| 2017/0195178 | A1 | 7/2017 | Kaluza et al. | |
| 2018/0203901 | A1 * | 7/2018 | Fawcett | G06F 16/24568 |
| 2019/0028355 | A1 * | 1/2019 | Subramanian | H04L 41/0806 |
| 2019/0387411 | A1 * | 12/2019 | Choi | H04W 16/10 |
| 2020/0374711 | A1 | 11/2020 | Honkasalo et al. | |

FOREIGN PATENT DOCUMENTS

| | | | | |
|---|---|---|---|---|
| WO | WO-2019025944 | A1 * | 2/2019 | G06F 9/5072 |
| WO | WO-2019034601 | A1 * | 2/2019 | H04W 24/02 |

OTHER PUBLICATIONS

Mubeen, Saad et al., "Management of Service Level Agreements for Cloud Services in IoT: A Systematic Mapping Study," IEEE Access 6 (2018): 30184-30207, 24 pages.

Lamanna, D.D. et al., "SLAng: A Language for Defining Service Level Agreements," The Ninth IEEE Workshop on Future Trends of Distributed Computer Systems, 2003, 7 pages.

Richter, Michael M. et al, "Case-Based Reasoning—Chapter 2—Basic CBR Elements," Springer Berlin, Heidelberg, 2013, 24 pages.

Extended European Search Report, European Patent Application No. 21925953.8, mailed Sep. 27, 2024, 9 pages.

Office Action, Chinese Patent Application No. 202180093187.2, mailed May 27, 2026, 10 pages.

Rong, C, "Research on Mobile Data Prediction Model and Improvement of Platform Data Management Module, China's Outstanding Master's Theses Full-Text Database (Information Technology Edition)" Mar. 15, 2010, 104 pages.

Papageorgiou, A., et al., "Auto-configuration System and Algorithms for Big Data-Enabled Internet-of-Things Platforms," 2014 IEEE International Congress on Big Data, Sep. 25, 2014, pp. 490-497, 8 pages.

\* cited by examiner

200

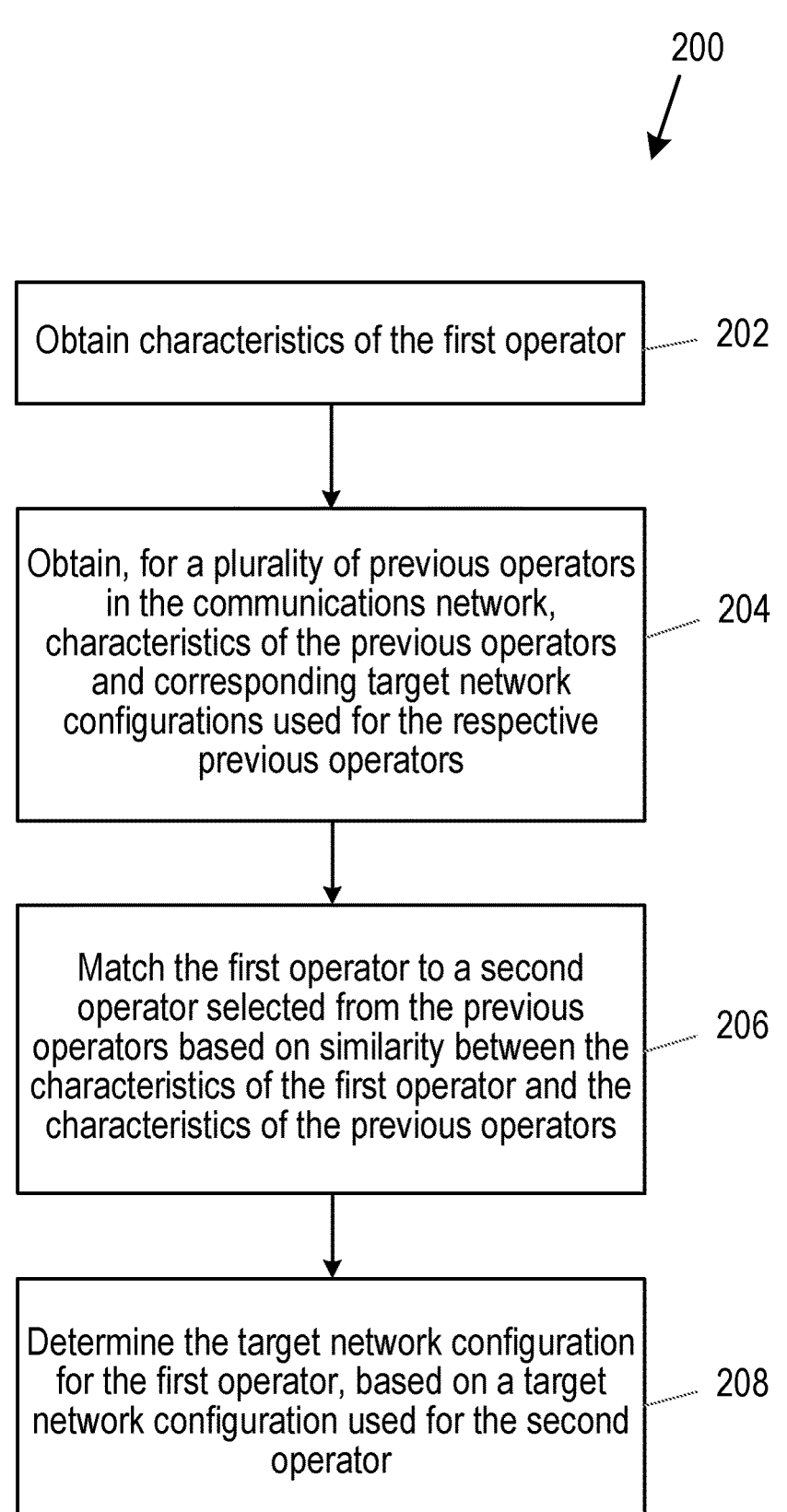

Obtain characteristics of the first operator — 202

Obtain, for a plurality of previous operators in the communications network, characteristics of the previous operators and corresponding target network configurations used for the respective previous operators — 204

Match the first operator to a second operator selected from the previous operators based on similarity between the characteristics of the first operator and the characteristics of the previous operators — 206

Determine the target network configuration for the first operator, based on a target network configuration used for the second operator — 208

Fig. 2

METHODS FOR DETERMINING A TARGET NETWORK CONFIGURATION

CROSS REFERENCE TO RELATED APPLICATIONS

This application is a 35 U.S.C. § 371 national stage application of PCT International Application No. PCT/SE2021/050096 filed on Feb. 9, 2021, the disclosure and content of which is incorporated by reference herein in its entirety.

TECHNICAL FIELD

This disclosure relates to methods, nodes and systems in a communications network. More particularly but non-exclusively, the disclosure relates to determining a target network configuration for use in providing services to a network operator on the communications network.

BACKGROUND

Communications networks provide services to operators (e.g. vendors or customers) operating on the communications network. Such services may be provided according to a Service Level Agreement (SLA). Service level agreements stipulate a target network configuration with which the services should be provided. When negotiating an SLA, the operator may describe their requirements in terms of a target network configuration (otherwise known as a Business Intent, BI). Such target network configurations may be human readable or expressed in a human readable manner. Target network configurations may generally describe goals, e.g. "increased throughput".

Target network configurations are converted into key performance indicators (KPIs) which are measurable quantities in the communications network, for example, Latency and Throughput. This allows human-readable target network configurations to be expressed in a form that can be monitored. KPIs thus allow the performance of the communications network to be monitored, compared to the terms of the agreed SLA. If a KPI target is missed, then this counts as a violation of the SLA.

SUMMARY

As noted above, services are provided to operators according to an SLA. Negotiating and signing an SLA with an operator is often a complex and largely manual process, due to the complexities of determining an appropriate target network configuration for use in providing services to the operator. Embodiments herein intend to improve on this situation.

Thus, according to a first aspect there is a method performed by a node in a communications network for determining a target network configuration for use in providing services to a first operator on the communications network. The method comprises obtaining characteristics of the first operator; obtaining, for a plurality of previous operators in the communications network, characteristics of the previous operators and corresponding target network configurations used for the respective previous operators; matching the first operator to a second operator selected from the previous operators based on similarity between the characteristics of the first operator and the characteristics of the previous operators; and determining the target network configuration for the first operator, based on a target network configuration used for the second operator.

According to a second aspect there is a node in a communications network for determining a target network configuration for use in providing services to a first operator on the communications network. The node comprises a memory comprising instruction data representing a set of instructions, and a processor configured to communicate with the memory and to execute the set of instructions. The set of instructions, when executed by the processor, cause the processor to: obtain characteristics of the first operator; obtain, for a plurality of previous operators in the communications network, characteristics of the previous operators and corresponding target network configurations used for the respective previous operators; match the first operator to a second operator selected from the previous operators based on similarity between the characteristics of the first operator and the characteristics of the previous operators; and determine the target network configuration for the first operator, based on a target network configuration used for the second operator.

According to a third aspect there is a node in a communications network for determining a target network configuration for use in providing services to a first operator on the communications network in a communications network. The node is adapted to: obtain characteristics of the first operator; obtain, for a plurality of previous operators in the communications network, characteristics of the previous operators and corresponding target network configurations used for the respective previous operators; match the first operator to a second operator selected from the previous operators based on similarity between the characteristics of the first operator and the characteristics of the previous operators; and determine the target network configuration for the first operator, based on a target network configuration used for the second operator.

According to a fourth aspect there is a computer program comprising instructions which, when executed on at least one processor, cause the at least one processor to carry out the method of the first aspect.

According to a fifth aspect there is a carrier containing a computer program according to the fourth aspect, wherein the carrier comprises one of an electronic signal, optical signal, radio signal or computer readable storage medium.

According to a sixth aspect there is a computer program product comprising non transitory computer readable media having stored thereon a computer program according to the fourth aspect.

Embodiments herein allow target network configurations to be predicted for a new operator, or an operator in changing circumstances, in an automated and predictable manner. This saves on the time and resources normally spent manually negotiating an appropriate target network configuration for an operator and can help improve customer onboarding. As will be described in detail below, some embodiments enable determination of a sufficient set of KPIs and their values to meet a target network configuration, with minimal resource cost and/or maximal reliability.

BRIEF DESCRIPTION OF THE DRAWINGS

For a better understanding and to show more clearly how embodiments herein may be carried into effect, reference will now be made, by way of example only, to the accompanying drawings, in which:

FIG. 2 shows a method according to some embodiments herein;

DETAILED DESCRIPTION

The disclosure herein relates to a communications network (or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 1:
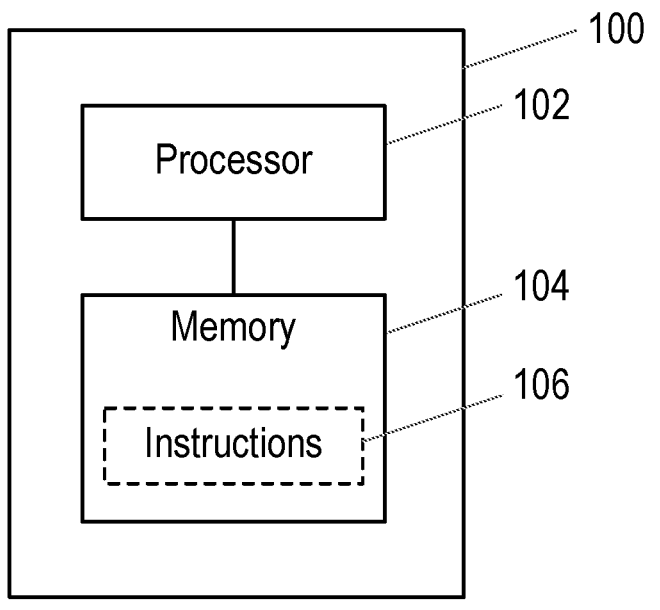
FIG. 1 shows a node according to some embodiments herein.

FIG. 1 illustrates a network node 100 in a communications network for determining a target network configuration for use in providing services to a first operator on the communications network, according to some embodiments herein. Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 100 is configured (e.g. adapted, operative, or programmed) to perform any of the embodiments of the method 200 as described below. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The node comprises a memory 104 comprising instruction data representing a set of instructions 106 and a processor 102 (e.g. processing circuitry or logic) configured to communicate with the memory and to execute the set of instructions 106. The set of instructions 106, when executed by the processor 102, cause the processor 102 to perform the method 200 described below.

In more detail, the processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

In some embodiments, the memory 104 of the node 100 can be configured to store program code or instructions 106 that can be executed by the processor 102 of the node 100 to perform the functionality described herein. Alternatively or in addition, the memory 104 of the node 100, can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

As noted above, the node 100 is for determining a target network configuration for use in providing services to a first operator on the communications network. The node is configured to obtain characteristics of the first operator; obtain, for a plurality of previous operators in the communications network, characteristics of the previous operators and corresponding target network configurations used for the respective previous operators; match the first operator to a second operator selected from the previous operators based on similarity between the characteristics of the first operator and the characteristics of the previous operators; and determine the target network configuration for the first operator, based on a target network configuration used for the second operator.

In this manner, an appropriate target network configuration with which to provide services to a first (e.g. new) operator may be determined without having to go through an extensive and often complex, manual negotiation process.

FIG. 2 illustrates a method performed by a node in a communications network for determining a target network configuration for use in providing services to a first operator on the communications network according to some embodiments herein. Briefly, in a first step 202 the method comprises obtaining characteristics of the first operator. In a second step 204, the method comprises obtaining, for a plurality of previous operators in the communications network, characteristics of the previous operators and corresponding target network configurations used for the respective previous operators. In a third step 206 the method comprises matching the first operator to a second operator selected from the previous operators based on similarity between the characteristics of the first operator and the characteristics of the previous operators. In a fourth step 208 the method comprises determining the target network configuration for the first operator, based on a target network configuration used for the second operator.

In more detail, the first operator may be a vendor, or customer of the service provider (or managed services provider). Services are provided to the first operator by the service provider of the communications network. In this sense, services may include, for example, providing resources to the operator. The operator may use the services to provide wireless access to end users (e.g. to wireless devices and user equipment).

The target network configuration, TNC (which might alternatively be thought of as a network configuration target, network configuration goal or network configuration objective) provides details of (e.g. indicates) the target standards under which the services should be provided to the first operator by the service provider when operating in the communications network. The target network configuration may comprise (e.g. be expressed in terms of) one or more business intents (Bis). Such target network configurations may be for use in a Service Level Agreement (SLA) that stipulates the level of service that the operator expects when receiving services from the service provider when using the communications network.

As noted above, target network configurations (e.g. BIs) typically express top-level requirements of operators operating on the communications network. A target network configuration may be expressed in a human-readable manner. As an example, a target network configuration may express a configuration of a particular network topology, or a desire to configure few 5G NR cells in a city's crowded downtown area. More complex intents could be, for example, maintaining or improving end-to-end application experience or improving the customer (e.g. end-user) satisfaction score by 2 percent points in a cluster of cells.

KPIs are measurable quantities in a communications network, for example, measures of latency and throughput.

In an example, the target network configuration "Improve Quality of Service (QoS)", may correspond to the two KPIs:
1, KPI1: Latency (to be decreased)
2. KPI2: Coverage (to be increased)

When a new operator is set up to operate on the communications network, or an existing operators circumstances or requirements change, then new target network configurations are negotiated for that operator. The high level target network configurations are then converted into measurable KPI targets and these are stipulated in the SLA for the operator. Currently, figuring out the target network configurations and relating them to KPI targets and as such for SLOs (service-level objectives which are part of an SLA), is mostly a manual task, requiring detailed analysis by experts on existing performance levels, the measurement capabilities, and KPI/KQI viability over the operator network and service delivery platforms to fully comprehend the definitions and targets. The agreed target network configurations are documented in a baseline document and validated with the operator before SLAs are agreed mutually. The services provider is required at least to meet the baseline. Usually after a few iterations with the operator, the service provider sets a) severity definitions, b) response times, c) SLA-KPI measurements methods and sources, d) SLA-KPI targets, and agrees on penalty clauses. If SLAs are breached, this results in penalties, service disruptions and operator dissatisfaction. Generally, if the targets are missed by the communications network (e.g. if services are provided that do not meet the KPI targets set out in the SLA) then a service violation may be recorded.

Embodiments herein aim to predict, adapt or adjust known (e.g. previously used) target network configurations upfront for a new operator or new operator instance, and further provide suggestions that enable target network configurations to be met with fewer resources. The methods herein propose a multi-component method for generating and suggesting target network configurations to a first operator (e.g. customer) in an automated manner, based on the first operator's similarity to previous operators operating on the communications network. The main idea is to use operators' historical SLA (including target network configurations, KPI, etc.) data, metadata and data about their networks to determine similar operators and their potentially similar needs in order to generate target network configurations/KPIs that can be best met with available resources.

In step 202 the method comprises obtaining characteristics of the first operator. The characteristics of the first operator may include attributes or properties that may be used to distinguish one operator from another. Generally, the characteristics may comprise operator metadata. For example, characteristics may include but are not limited to, operator metadata (e.g. line of business, size, tier), and their network parameters (e.g. size, geographical allocation, connection intensity).

As an example, the characteristics for the first Operator (Operator1) may be:

| Name | Time index | Network (NW) size | Tier |
|---|---|---|---|
| Operator1 | 2020 | Large NW | Gold tier |

The skilled person will appreciate that this is an example only and that many other characteristics may also be used.

In step 204 the method comprises obtaining, for a plurality of previous operators in the communications network, characteristics of the previous operators and corresponding target network configurations used for the respective previous operators.

Previous operators may include, for example, existing operators operating on the communications network, or operators who have previously operated on the communications network. The characteristic of the previous operators may be of the same type as those of the first operator, for example, operator metadata (e.g. line of business, size, tier), their network parameters (e.g. size, geographical allocation, connection intensity).

As noted above, the target network configurations may comprise BIs, for the previous operators (e.g. expressed in human-readable form).

Thus the output of step 204 may be a database comprising previous operators, characteristics of the previous operators and corresponding target network configurations (e.g. SLAs or parameters therefrom) agreed with said previous operators.

In some embodiments, the characteristics of the previous operators and corresponding target network configurations are time dependent. In other words, the characteristics of an operator, or the target network configuration agreed for said operator may change over time. The same operator can thus be seen to have different instances in time due to, for example, their growth, change in services or markets, or upgrading tiers. In such examples, the method 200 may further comprise determining different instances for a previous operator, each instance corresponding to a different time interval.

As an example, suppose two previous operators, Operator2 and Operator3, as follows:

| Name | Time index | NW size | Tier | KPI1 | KPI2 |
|---|---|---|---|---|---|
| Operator2 | 2018 | Large | Gold | <25 ms | >99% |
| Operator3 | 2018 | Medium | Gold | <25 ms | >95% |
| Operator3 | 2019 | Large | Gold | <25 ms | >97% |

In this example, Operator3 splits into two instances at respective years 2018 and 2019. In other words, the plurality of previous operators may comprise more than one entry for each previous operator, the more than one entry corresponding to different time periods. The characteristics and/or target network configuration of the previous operator may change in the different time periods.

In embodiments where the previous operators are split into different time instances above, the step of matching the first operator to the second operator may comprise matching the first operator to a particular instance of the second operator associated with a particular time interval. The step of determining the target network configuration for the first operator may thus be based on a target network configuration used for the second operator in the particular time interval associated with the particular instance.

In some embodiments, the target network configurations of the previous operators may be converted (e.g. translated or parsed) into a symbolic form. General methodologies for this exist, including Controlled Natural Languages (CNL), and specific methodologies for e.g. cloud and IoT provision are reviewed in the paper by Mubeen, Saad et al. "Management of Service Level Agreements for Cloud Services in IoT: A Systematic Mapping Study." IEEE Access 6 (2018): 30184-30207. For example, SLAng or other formal languages could be used to model the target network configurations. SLAng is described in the paper by D. D. Lamanna, J. Skene and W. Emmerich, "SLAng: a language for defining service level agreements," The Ninth IEEE Workshop on Future Trends of Distributed Computing Systems (2003): 100-106. Parsing the target network configurations in this manner makes them more easily machine readable, and easier to compare in an automated manner. Symbolic grounding of target network configurations thus creates a parser and an ontology that can be used across all operators.

Turning now to step 206 in which, as noted above, the first operator is matched to a second operator selected from the previous operators based on similarity between the characteristics of the first operator and the characteristics of the previous operators.

In some embodiments, the step of matching the first operator to the second operator is performed using a similarity assessment method and/or similarity measures, for example from case-based reasoning. The skilled person will be familiar with similarity assessment methods, but in brief, a similarity measure may be thought of as a function of similarity, SIM, that assigns, given two input arguments O1 and O2 (which herein comprise the first operator and a previous operator with their respective characteristics), a numerical score in between 0 and 1: SIM(O1, O2)=x, where $0 \le x \le 1$. So, matching O1 with O2 amounts to finding O2 with minimal SIM(O1, O2). Matching O1 with N most similar past operators amounts to finding N operators O that give the N smallest values SIM(O1, O). This is merely an example however and other examples may be found, for example, in the book entitled "Case-Based Reasoning" by Richter and Webber.

The output of such similarity assessment (e.g. the output of step 206) may comprise a distance measure, or similarity indices, over vectors of the characteristics of the previous operators. In other words, a measure of relative similarity may be obtained for each previous operator, describing the relative similarity of said previous operator to the first operator compared to the other previous operators. Similarity indices allow for clustering of similar previous operators and thus allows "cases" to be defined comprising:

1. a set of characteristics in the form of feature-value pairs describing each previous operator (e.g. (t:2018, NW:Large, T:Gold)), and
2. a "solution", pertaining to a set of KPIs corresponding to a target network configuration that were defined for the previous operator (e.g. (KPI1<25 ms, KPI2>99%)).

Similarly, the first operator (e.g. a new case) is so described, but without a solution, which is to be determined in step 208, as described below.

In some embodiments, the second operator may be selected as being the operator that is most similar to the first operator (e.g. on the basis of a similarity measure as described above).

In some embodiments, the step of matching the first operator to the second operator may be performed using clustering. For example, clustering may be performed on the characteristics of the previous operators and the characteristics of the first operator. The method may then comprise selecting the second operator from a cluster comprising the first operator. In other words, matching the first operator to a previous operator in the same cluster.

Clustering may be performed using unsupervised learning (from machine learning (ML)) techniques to statistically cluster operators based on their structured data. Standard clustering techniques may be used, especially if the time component is discretized into large intervals and hence acts as yet another discrete-value feature.

In some embodiments, long-short term memory (LSTM) networks may be employed for classification if time is densely indexed. For example, if each operator is split into many different time intervals of short duration, then this may inadvertently bias a standard clustering technique. In such circumstances, an LSTM network may be used instead. In this way, operator similarity may be determined using state-of-the-art unsupervised learning (from machine learning (ML)) techniques to statistically cluster operators based on their structured data.

Thus step 206 may comprise predicting a second operator using a long short term memory, (LSTM). The LSTM may be trained on the characteristics of the plurality of previous operators to predict a matching second operator for the first operator. LSTM is a supervised learning algorithm and a LSTM is trained using training data comprising example inputs and example (e.g. "correct") outputs or ground truths. In embodiments herein, the ground truth can, for example, be the exact same KPIs that have been periodically agreed in SLAs, labels from some initial similarity analysis, or expert defined labels.

As an example, the training data could comprise time-indexed examples comprised of features and ground truth, e.g.

(time:2018-12-01, Name:O2, NW:Large, Tier:Gold, KPI: <25 ms)
(time:2018-12-02, Name:O2, NW:Large, Tier:Gold, KPI: <20 ms)

(time:2018-12-03, Name:O2, NW:Large, Tier:Gold, KPI:
<25 ms)

. . .

Here the operator's O2 KPI requirement (ground truth) has been changing with daily time steps. In training, an LSTM network's layers are updated at each time step. Step 206 may thus comprise predicting KPI values for a sequence of new timed-instances of O2.

The skilled person will be familiar with ways in which to train a LSTM to predict a match to a first operator from a training data set comprising a plurality of example previous operators and example matches for said previous operators (e.g. back propagation and gradient descent etc).

Turning to step 208, the method then comprises determining (208) the target network configuration for the first operator, based on a target network configuration used for the second operator.

For example, one or more parameter values from the target network configuration used for the second operator may be selected for the first operator. The target network configuration for the second operator may be selected for the first operator (e.g. in its entirety). Or a subset of parameters from the target network configuration of the second operator.

In some embodiments, the target network configurations of more than one previous operator may be combined and suggested for use by the first operator.

For example, the step of matching the first operator to a second operator may further comprise: matching the first operator to a third operator selected from the previous operators and determining the target network configuration for the first operator from the target network configurations of the second and third operators. The skilled person will appreciate that this may be extended to any number of the most closely matching previous operators.

In some embodiments, case based reasoning (CBR) may be used in step 208 to generate solutions by adapting the previous ones. CBR may be applied to both time-dependent and independent previous operator data.

As an example, an average of one or more parameters (e.g. parameter values) in the target network configurations of the second and third (and subsequent, if applicable) operators may be used in the target network configuration of the first operator. In this sense, an average may comprise an aggregate function, such as for example, a mean, median, mode, min, max, or any other functional composition of the parameter values in the target network configurations of the second and third operators.

In one example, the k-Nearest Neighbors (k-NN) technique can be employed, whereby for a given first operator, a number k (e.g. 3) of most similar previous operators are selected as matches (in step 206) and the target network configuration of the majority (e.g. 2 out of 1) of those is used for the first operator. If the solutions of the chosen most similar past cases are not identical, they can be adapted, e.g. averaging as described above and/or using expert-defined combined solutions, depending on the application.

In some embodiments, step 208 may comprise selecting a target network configuration from the target network configurations of the second and third operators, based on the resources required to meet each of the target network configurations of the second and third operators. For example, step 206 may comprise selecting a target network configuration from the second and third operators that requires the least resource, as the target network configuration for the first operator.

For example, if one of the previous target network configurations requires fewer resources to meet then this may be suggested as the target network configuration for the first operator. This may be performed on a parameter basis, for example, a KPI latency requirement of <15 ms is "cheaper" than <10 ms, so the target network configuration can be selected for the first operator by e.g. taking min or max of KPIs to reflect the resource-cheapest configuration. In this way, appropriate target network configurations may be suggested that are also efficient. This allows the gap to be closed between the available resources for network optimization and the business proposition.

In another example, performance, or adherence of the service provider to the previous target network configurations may be taken into account. For example, it may be more desirable to recommend a target network configuration that the service provider has historically been able to consistently meet compared to recommending a target network configuration that the service provider has been unable to meet.

Thus in some embodiments, the step of determining the target network configuration for the first operator may comprise selecting a target network configuration from the target network configurations of the second and third operators, based on previous performance of the communications network relative to the respective target network configurations. As an example, the performance may be measured according to the number of recorded violations (e.g. SLA violations) of the target network configuration. This may be determined from records of how many (and how severe) SLA violations there were.

This is advantageous as it should ensure more SLAs are met, since it is known upfront that the communications network can meet them, thus improving reliability and experience for end users.

As an example illustrating some of the principles above, suppose a (new) first operator, for which a target network configuration is to be predicted and KPIs established, has the following characteristics:

Operator1 2020 Large NW Gold tier

In step 204, a plurality of previous operators having the following characteristics and target network configurations (expressed in corresponding KPIs) are obtained:

| Name | Time index | NW size | Tier | KPI1 | KPI2 |
|------|-----------|---------|------|------|------|
| Operator2 | 2018 | Large | Gold | <25 ms | >99% |
| Operator3 | 2018 | Medium | Gold | <25 ms | >95% |
| Operator3 | 2019 | Large | Gold | <25 ms | >97% |

In this example, the first operator, Operator1, is deemed most similar to {Operator2, Operator3-2019}, and the 3rd most similar case is Operator3-2018. Using 3-NN, the target network configurations of Operator2 and Operator3-2019 are adapted for Operator1. For instance, KPI1 could be taken as is, namely <25 ms, and KPI2 averaged (of 99% and 97%) to be set at >98%. For a more sophisticated approach, an expert-defined rule can be used that insists on picking the resource-cheapest option for KPI2, in this case >97%, which should satisfy Operator1 as an initial value. Thus, in this example, the target network configuration of (KPI1<25 ms, KPI2>97%) is determined for the first operator with the corresponding target network configuration "Improve QoS".

Turning now to other embodiments, preferences of the first operator may alternatively or additionally be taken into account. For example, the first operator e.g. engineers or other human representatives of the first operator, may specify/provide (e.g. in the form of a user input), one or more parameters or other requirements (for example in the form of a partial network configuration). These may be taken into account in the method 200. For example, in step 208 in embodiments where the target network configuration is determined from the target network configurations of second and third (and/or subsequent) previous operators, preference may be given to parameters therein that are closest to any criterion provided by the first operator.

The method 200 may alternatively or additionally be used to determine or predict any missing parameters of a partially specified target network configuration, for example, in examples where the representatives of the first operator provide a partial SLA, missing/complementary parameters may be determined.

Thus, in some embodiments, the step of determining the target network configuration for the first operator may comprise selecting a target network configuration from the target network configurations of the second and third operators, based on one or more criterion provided by the first operator.

In summary, the method 200 involves determining matching previous operator(s) to the first operator and then determining the target network configuration for the first operator from the target network configuration(s) of the matching previous operator(s). By first matching to previous operators and then subsequently determining an appropriate target network configuration for the first operator based on a target network configuration used for the second operator, the prediction process is transparent to a human operator. Compared to predicting a target network configuration directly from the characteristics (e.g. in a "black box" manner), this method also requires fewer previous operator examples, e.g. less training data. In particular, the CBR examples described above employ "lazy learning" whereby given a new instance, learning is performed using the relatively few most relevant examples. Furthermore, the number of input and output parameters may be permitted to vary (e.g. compared with machine learning approaches which can require a fixed number of outputs). There is thus provided a method of determining a target network configuration suitable for use in an SLA in an automated and transparent manner.

Figure 3:
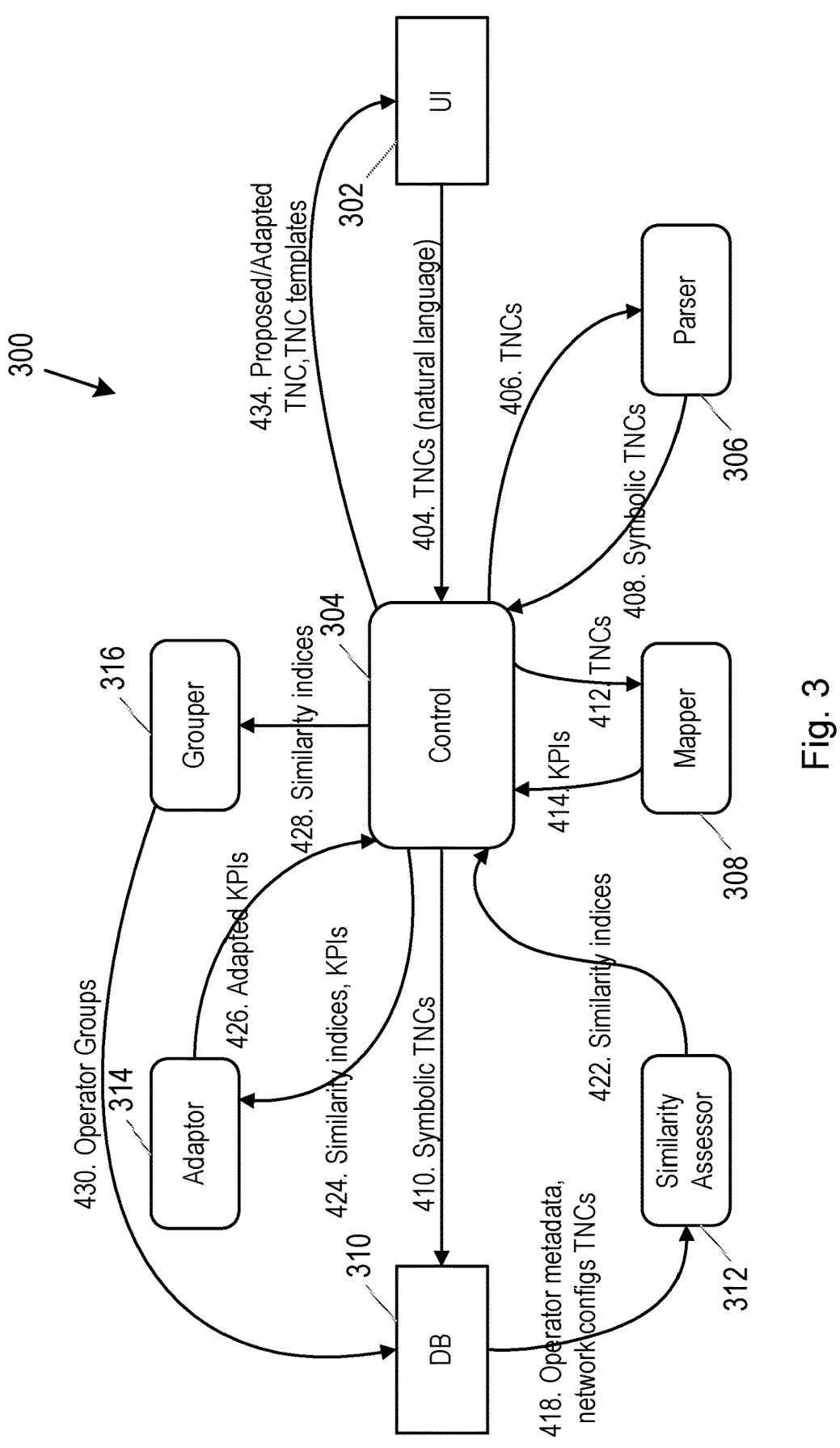
FIG. 3 shows system according to some embodiments herein.

Turning now to FIG. 3 which illustrates a system according to an embodiment herein. In this embodiment, there are three main nodes: a user interface (UI) 302, a control node (Control) 304 and a database (DB) 310.

The UI 302 may comprise, for example, an input device such as a mouse or keyboard and/or a display. The UI 302 may be used for example, to obtain any criterion from the first operator (as described above), and also to present the determined target network configuration to a user. The DB 310 contains information about operators in symbolic/machine processable form. This includes but need not be limited to previous SLAs, target network configurations (e.g. Bis), KPIs/KQIs, operator metadata (e.g. line of business, size, tier), their network parameters (e.g. size, geographical allocation, connection intensity).

The control node 304 primarily enables comparison of operators as well as prediction of appropriate target network configurations for new operators (e.g. first operators described above).

In this embodiment, the Control 304 is split over (or controls) five components, a Parser 306, a mapper 308, a similarity assessor 312, an adapter 314 and a grouper 316. With respect to FIG. 1 above, the Control 304, Parser 306, mapper 308, similarity assessor 312, adapter 314 and grouper 316 may form part of the node 100. The skilled person will appreciate that this is an example only however and that the functionality herein may be split between different modules to those illustrated in this embodiment.

Parser 306

In this example, the parser 306 translates the target network configurations of the plurality of previous operators (e.g. SLAs and user expressed BIs) into a symbolic form. This was described above with respect to step 204 and the detail therein will also be understood to apply equally to this embodiment. CNL and/or templates can be used to connect the formal representation with that of the UI 302 in a straightforward manner. The symbolic representations of the previous target network configurations, together with any relevant information may be stored in the DB 310.

Mapper 308

The mapper maps (e.g. relates) target network configurations with corresponding KPIs, which enables symbolic target network configurations to be expressed in the form of objective measurements in the communication network. The skilled person will be familiar with methods of mapping target network configurations to KPIs. In the basic setting, a static mapping can be used whereby a given target network configuration is mapped to a list of KPIs, using expert knowledge.

Similarity Assessor 312

The similarity assessor performs step 204 and obtains for a plurality of previous operators in the communications network, characteristics of the previous operators and corresponding target network configurations used for the respective previous operators (in other words it obtains previous operator data) from the DB 310 and uses it to determine similarities among operators, or more precisely, among operator instances (in time). As described above, the same operator can be split into different instances corresponding to different time intervals, due to, for example, growth, change in services or markets, upgrading tiers etc. For simplicity, we henceforth simply use operator, potentially referring to its instance in time.

The similarity assessor then performs step 206 and matches the first operator to a second (and in some embodiments, subsequent) operator(s), based on similarity. The similarity assessment may be performed using any of the methods described above with respect to step 206, for example, using similarity assessment techniques from CBR, or using unsupervised learning (from machine learning (ML)) techniques to statistically cluster operators based on their structured data. Standard clustering techniques, or LSTM networks (for classification if time is densely indexed) may also be used. As described above, the similarity assessor 312 may output similarity indices (e.g. such as a distance measure) describing the similarity of each previous operator when compared to the other previous operators. This may be used by the adaptor component 314 as below.

Adaptor 314

The adaptor module performs step 208 and determines a target network configuration for the first operator from the matching second operator. As described above, the most similar n previous operators may alternatively be matched to the first operator, in which case, the adaptor uses Case-Based Reasoning (CBR) to generate a target network configuration for the first operator by adapting the target network configurations of the n most closely matching previous operators.

As described above, with respect to step 208, various state-of-the-art CBR techniques may be used to determine a target network configuration for the first operator, based on the target network configurations of the second (and third and subsequent) previous operators, and the examples given above will be understood to apply equally to the example of FIG. 3. For example, the target network configurations of second, third and subsequent previous operators may be adapted using e.g. averaging and/or using expert-defined combined solutions, depending on the application.

Grouper 316

The grouper 316 collects the previous operator data and groups them according to their similarities (using similarity indices, clustering and potentially expert knowledge) to be stored in the DB for a new cycle of predicting target network configurations etc.

Figure 4:
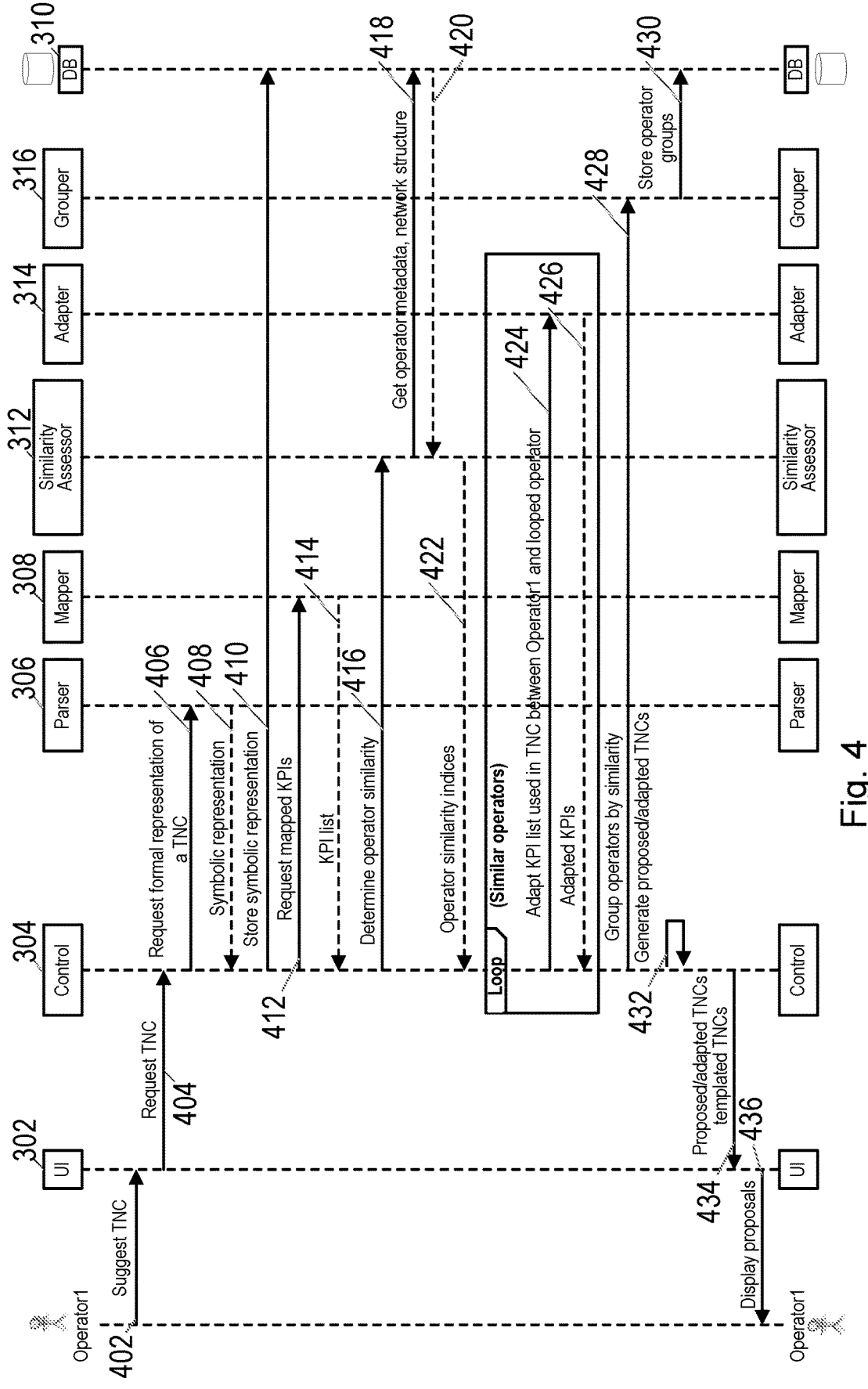
FIG. 4 shows a signal diagram according to some embodiments herein.

Turning now to FIG. 4 which illustrates a signalling diagram between the components illustrated and described above with respect to FIG. 3.

In step 402 a user inputs to a UI 302 one or more criterion for use in determining a target network configuration for a first operator. The criterion may comprise, for example, a partial target network configuration (TNC), such as one or more suggested parameters or constraints for the target network configuration.

In step 404 the UI sends the criterion to the Control 304 and requests that the control determines a target network configuration (TNC) for the first operator.

The control 304 sends a message 406 to the parser 306, the message 406 comprises the criterion and requests the parser convert the criterion from the first operator into symbolic form. In step 408 the parser 306 sends the criterion back to the control 304 in the symbolic form.

In step 410, the control 304 sends the criterion in symbolic form for storage in database 310.

In step 412, the control 304 sends the symbolic criterion to the mapper 308 and requests that the mapper converts it into KPIs. The requested KPIs are sent back to the control in step 414.

In step 416, the control 304 then requests the similarity assessor 312 to determine the similarity of the first operator to the each of the plurality of previous operators.

The control sends any characteristics available for the first operator to the similarity assessor 312. The similarity assessor 312 performs steps 202 and 204 described above and obtains characteristics for each of the plurality of previous operators, and potentially any stored characteristics for the first operator, by requesting these from the database 310 in step 418, where the database sends the characteristics of all the operators in question in step 420.

The similarity assessor 312 sends a parameter describing the similarity of each of the previous operators to the control 304 in step 422. The control 304 then matches the first operator to a second operator (or operators) selected from the previous operators based on the similarity of the characteristics of the first operator and the characteristics of the previous operators (e.g. performs step 206 described above).

In step 424 the control asks the adapter 314 to determine the KPIs for the first operator based on the KPIs used for operator(s) matched in step 422 above. In step 426 the determined KPIs for the first operator are sent back to the control 304.

In step 428 operators together with their characteristics and KPIs are grouped according to similarity by the grouper 316 and in step 430 groups of operators may be stored in a database 310.

In step 432 the control then determines (as in step 208 described above) the target network configuration for the first operator, based on a target network configuration used for the second operator. This may take into account the user input criterion received by the control in step 304 (for example, the user input may be complemented with parameters from the target network configurations of the most closely matching operators). The proposed target network configuration for the first operator is then sent in step 434 to the UI 302 to be displayed in step 436 to the first operator 402.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method performed by a node in a communications network for determining a target network configuration for use in providing services to a first operator on the communications network, the method comprising:
   obtaining characteristics of the first operator;
   obtaining, for a plurality of previous operators in the communications network, characteristics of the previous operators and corresponding target network configurations used for the respective previous operators;
   matching the first operator to a second operator selected from the previous operators based on similarity between the characteristics of the first operator and the characteristics of the previous operators; and
   determining the target network configuration for the first operator, based on a target network configuration used for the second operator.

2. A method as in claim 1 wherein the step of matching the first operator to the second operator is performed using a similarity assessment method.

3. A method as in claim 1 wherein the step of matching the first operator to the second operator comprises:
   performing clustering on the characteristics of the previous operators and the characteristics of the first operator; and
   selecting the second operator from a cluster comprising the first operator.

4. A method as in claim 1 wherein the step of matching the first operator to the second operator comprises:
   predicting a matching second operator using a long short term memory (LSTM) network, wherein the LSTM is trained on the characteristics of the plurality of previous operators to predict a second operator for the first operator.

5. A method as in claim 1 wherein the characteristics of the previous operators and corresponding target network configurations are time dependent and wherein the method further comprises:
   determining different instances for a previous operator, each instance corresponding to a different time interval; and
   wherein the step of matching the first operator to the second operator comprises matching the first operator to a particular instance of the second operator associated with a particular time interval; and
   wherein the step of determining the target network configuration for the first operator is based on a target network configuration used for the second operator in the particular time interval associated with the particular instance.

6. A method as in claim 1 wherein the step of determining the target network configuration for the first operator comprises selecting one or more parameter values from the target network configuration used for the second operator, for the first operator.

7. A method as in claim 1 wherein the step of matching the first operator to a second operator further comprises: matching the first operator to a third operator selected from the previous operators and determining the target network configuration for the first operator from the target network configurations of the second and third operators.

8. A method as in claim 7 wherein the step of determining the target network configuration for the first operator is performed using a case-based reasoning method.

9. A method as in claim 7 wherein the step of determining the target network configuration for the first operator comprises: using an aggregate function or average of one or more parameters in the target network configurations of the second and third operators.

10. A method as in claim 7 wherein the step of determining the target network configuration for the first operator comprises: selecting a target network configuration from the target network configurations of the second and third operators, based on resources required to meet each of the target network configurations of the second and third operators.

11. A method as in claim 10 comprising selecting a target network configuration from the second and third operators that requires the least resources, as the target network configuration for the first operator.

12. A method as in claim 7 wherein the step of determining the target network configuration for the first operator comprises: selecting a target network configuration from the target network configurations of the second and third operators, based on previous performance of the communications network relative to the respective target network configurations.

13. A method as in claim 12 wherein the performance is measured according to violations of the target network configurations of the second and third operators.

14. A method as in claim 7 wherein the step of determining the target network configuration for the first operator comprises: selecting a target network configuration from the target network configurations of the second and third operators, based on one or more criterion provided by the first operator.

15. A method as in claim 1 wherein the target network configuration comprises a business intent (BI) or a target for a key performance indicator (KPI).

16. A computer program comprising instructions which, when executed on at least one processor, cause the at least one processor to carry out a method according to claim 1.

17. A node in a communications network for determining a target network configuration for use in providing services to a first operator on the communications network, the node comprising:
   a memory comprising instruction data representing a set of instructions; and
   a processor configured to communicate with the memory and to execute the set of instructions, wherein the set of instructions, when executed by the processor, cause the processor to:
   obtain characteristics of the first operator;
   obtain, for a plurality of previous operators in the communications network, characteristics of the previous operators and corresponding target network configurations used for the respective previous operators;
   match the first operator to a second operator selected from the previous operators based on similarity between the characteristics of the first operator and the characteristics of the previous operators; and
   determine the target network configuration for the first operator, based on a target network configuration used for the second operator.

18. A node in a communications network for determining a target network configuration for use in providing services to a first operator on the communications network, the node being adapted to:
   obtain characteristics of the first operator;
   obtain, for a plurality of previous operators in the communications network, characteristics of the previous operators and corresponding target network configurations used for the respective previous operators;

match the first operator to a second operator selected from the previous operators based on similarity between the characteristics of the first operator and the characteristics of the previous operators; and determine the target network configuration for the first operator, based on a target network configuration used for the second operator.

19. A carrier containing a computer program according to claim 16, wherein the carrier comprises a non-transitory computer readable storage medium.

20. A computer program product comprising non-transitory computer readable media having stored thereon a computer program according to claim 16.

\* \* \* \* \*